United States Patent [19]

Shiraishi

[11] Patent Number: 5,203,420
[45] Date of Patent: Apr. 20, 1993

[54] AUXILIARY STEERING MECHANISM FOR AUTOMOTIVE VEHICLES

[75] Inventor: Yasuhiro Shiraishi, Atsugi, Japan

[73] Assignee: Nissan Motor Co., Ltd., Yokohama, Japan

[21] Appl. No.: 772,124

[22] Filed: Oct. 9, 1991

Related U.S. Application Data

[63] Continuation of Ser. No. 492,052, Mar. 12, 1990, abandoned.

[30] Foreign Application Priority Data

Apr. 25, 1989 [JP] Japan ................... 1-103456

[51] Int. Cl.$^5$ .............................................. B62D 5/04
[52] U.S. Cl. .................................. 180/79.1; 180/140;
180/142; 364/424.05; 364/571.01
[58] Field of Search .............. 180/140, 141, 142, 79.1;
364/424.05, 571.01; 33/1 PT

[56] References Cited

U.S. PATENT DOCUMENTS

| 4,735,271 | 4/1988 | Shimizu | 180/79.1 |
| 4,754,829 | 7/1988 | Shimizu | 180/79.1 |
| 4,794,536 | 12/1988 | Eto et al. | 180/141 |
| 4,796,904 | 1/1989 | Kubo | 180/141 |
| 4,803,629 | 2/1989 | Noto et al. | 180/142 |
| 4,939,654 | 7/1990 | Kouda et al. | 180/142 |
| 4,947,328 | 8/1990 | Sugasawa | 180/142 |

FOREIGN PATENT DOCUMENTS 3816484 12/1988 Fed. Rep. of Germany .
3819837 1/1989 Fed. Rep. of Germany .

Primary Examiner—Mitchell J. Hill
Attorney, Agent, or Firm—Leydig, Voit & Mayer

[57] ABSTRACT

A working neutral steering position of an auxiliary steering mechanism is checked for deviation from a true neutral position. When a deviation is present it is corrected to correspond to the actual neutral position of the steering wheel, at a controlled rate.

8 Claims, 3 Drawing Sheets

AUXILIARY STEERING MECHANISM FOR AUTOMOTIVE VEHICLES

This application is a continuation of application Ser. No. 07/492,052, filed Mar. 12, 1990 now abandoned.

BACKGROUND OF THE INVENTION

1. Field of the Invention

The present invention relates to an improved apparatus for controlling an auxiliary steering mechanism of an automotive vehicle. More specifically, the present invention relates to an auxiliary steering control arrangement wherein deviations which are produced by erroneous sensing of the rotation of a steering wheel with respect to its neutral or home position, are corrected at a controlled rate so as to avoid sudden changes in the steering angle of the auxiliary steering mechanism.

2. Description of the Prior Art

In the art of vehicular steering mechanisms, auxiliary steering mechanisms have been proposed for the purpose of improving both high speed cornering and low speed maneuverability of a vehicle. In these systems the auxiliary steering mechanisms are provided in connection with at least two of the vehicle's wheels, such as the rear wheels. An example of such a system is given in JP-A-61-41676.

The steering angle of the auxiliary steering mechanism is controlled on the basis of a detected steering wheel angle and according to the speed of the vehicle.

Generally, in such systems, a pulse counting means, which includes a light source/shutter type arrangement or the like, is operatively connected with the steering wheel or steering shaft. The pulses are counted by the pulse counting means as the steering wheel is rotated from its neutral position, in order to determine the amount of rotation of the wheel and the angle to which it is desired to turn the steering wheels of the vehicle. This pulse counting means is designed to provide a signal which is indicative of the angular disposition of the steering wheel and which forms a basis for the control of the auxiliary steering mechanism.

In such a system it is conceivable to perform all subsequent steering angle determinations by continuously updating the detected steering wheel angle, on the basis of the number of pulses which are counted up or down from the last detected angular position of the steering wheel.

However, in such pulse count type steering wheel angle detection arrangements it sometimes happens that when the steering wheel is very rapidly rotated, the pulses are erroneously counted. This results in the steering wheel being indicated as being in a position other than the one it is actually in. Thus, if the steering angle detected by the pulse counting means, is simply updated perpetually on the basis of the number of pulses counted, there is a tendency for any error generated during a sensing operation to carry over into all subsequent steering angle sensing operations.

In order to avoid the latter problem, the sensing means is arranged such that a signal is generated each time the steering wheel is returned to its home or neutral position. Upon receipt of this signal the auxiliary steering mechanism is induced to produce a zero steering condition.

While this arrangement eliminates the possibility of cumulative errors being generated and sustained in the steering wheel angle sensing mechanism, it induces the problem that, regardless of the magnitude of error in the sensed position of the steering wheel, when the steering wheel returns to or passes through the neutral position the auxiliary steering mechanism is induced to return immediately to its neutral steering state.

Accordingly, when the steering wheel is returned to its the neutral position, there is the possibility that an error may be cancelled and a sudden change be produced in the steering angle of the auxiliary steering. This tends to expose the vehicle occupants to the dangers accompanying unpredictable steering response, as well as giving the driver an alarming sense incongruity in the vehicular handling characteristics. This danger is particularly pronounced at high vehicular speeds, whereat even slight changes in the steering angle, can have a pronounced effect.

SUMMARY OF THE INVENTION

It is an object of the invention to provide an auxiliary steering mechanism wherein any corrections which are necessary in the steering produced by the auxiliary turning mechanism, are made in a manner which obviates the chances of sudden and unexpected changes in steering characteristics occurring when the steering wheel assumes and or passes through its neutral position.

In brief, the above object is achieved by an arrangement wherein a calculated or working neutral steering position of an auxiliary steering mechanism is checked for deviation from a true neutral position. When a deviation is detected it is reduced at a controlled rate to zero with respect to the actual neutral position of the steering wheel.

More specifically, a first aspect of the present invention is deemed to comprise an auxiliary steering mechanism for an automotive vehicle which controls an auxiliary steering angle of at least one of a rear wheel and a front wheel of the vehicle and which features: sensing means for detecting a neutral position of a steering wheel, and for outputting a neutral position indicative signal indicative of the neutral position of the steering wheel; control means for determining the auxiliary steering angle on the basis of a working neutral position value, the working neutral position value being representative of a neutral position of the steering wheel; updating means for detecting deviation of the working neutral position value from an actual neutral position of the steering wheel, and updating the working neutral position value to conform to the actual neutral position of the steering wheel, at a controlled rate.

A second aspect of the present invention is deemed to comprise a steering sensor arrangement which features: means for producing a first signal which is indicative of the amount of rotation of a shaft from a neutral position; means responsive to the first signal for determining and memorizing an angular position indicated by the first signal; means for producing a home position signal indicative of the shaft having assumed the neutral position; means for checking the angular position indicated by the first signal each time the home position signal is issued; and means for correcting a discrepancy between the angular position indicated by the first signal and the neutral position at a predetermined rate.

DETAILED DESCRIPTION OF THE PREFERRED EMBODIMENTS

An auxiliary steering mechanism according to the present invention, is controlled on the basis of a steering angle control value determined according to the number of pulses 1 counted from a working neutral position $\theta c$ of the steering wheel The working neutral position value $\theta c$ of the steering wheel is frequently updated to reduce any discrepancy between it and the actual home or neutral position.

In this arrangement, when the front (steering) wheels of vehicle are turned, at least one of either the front or the rear wheels, are also subject to auxiliary steering control. The amount of auxiliary steering is of course determined with respect to the value of $\theta c$.

Figure 1:
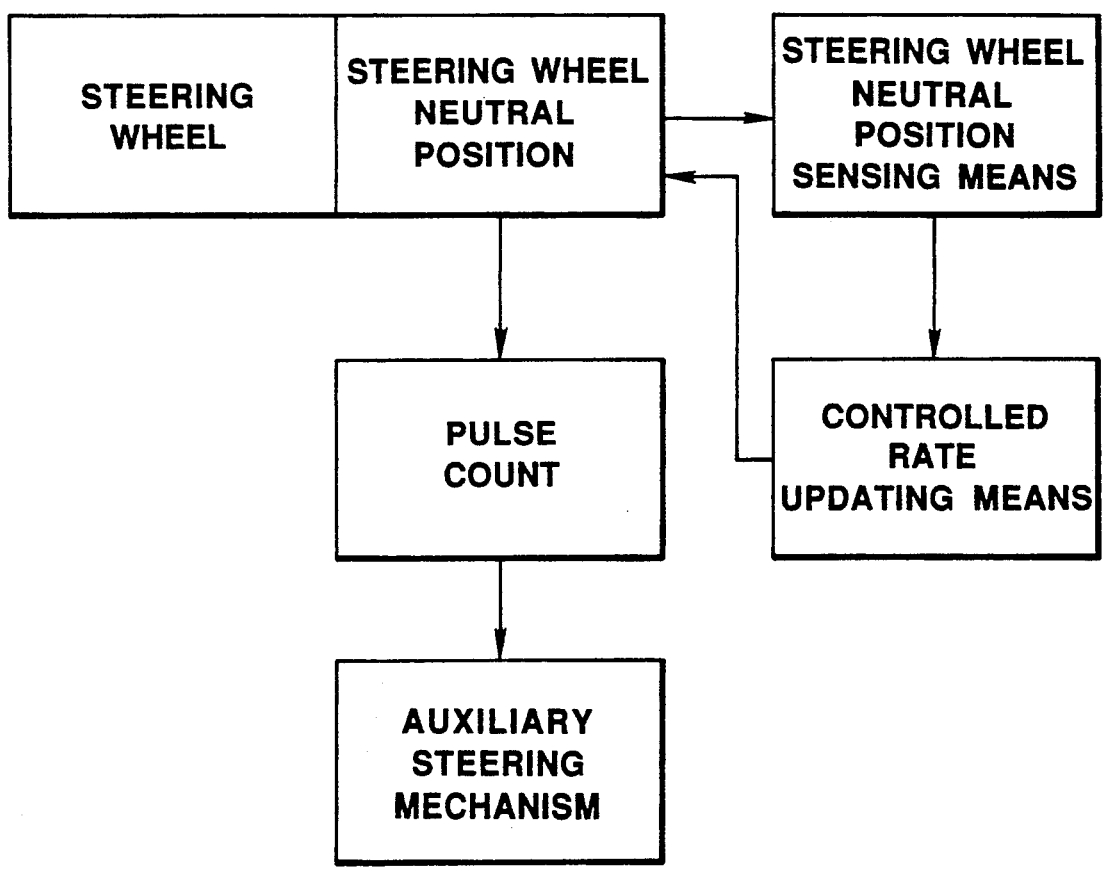
FIG. 1 is a block diagram showing the conceptual arrangement of the present invention.

FIG. 1 is a schematic representation of the conceptual relationships between the major components of the control device according to the invention. In the depicted system, in order to detect whether the steering wheel is actually at the neutral position, a steering wheel neutral position sensing arrangement is provided to output a signal to a controlled rate updating means. This controlled rate updating means updates a working neutral position value of the steering wheel, so as to correspond to the actual neutral position of the steering wheel, at a regulated rate.

In this manner, any deviation, which may occur in the sensed position of the steering wheel, from the actual position of the steering wheel, can be compensated for, and eliminated, in a gradual and controlled manner.

In this way, the tendency for the sudden changes in the vehicular handling characteristics, or for the steering direction of the vehicle to change suddenly when the steering wheel is returned to the neutral position, and the sense of incongruity in the control characteristics of the vehicle, as mentioned above in connection with the prior art, is eliminated.

Furthermore, due to the fact that the updating of the working neutral position value, takes place gradually, even if the adjustment takes place while the vehicle is running at a high speed, the adjustments are made at such a rate that there is plenty of time for the driver of the vehicle to compensate for the changes in steering direction without any particular conscious effort.

Figure 2:
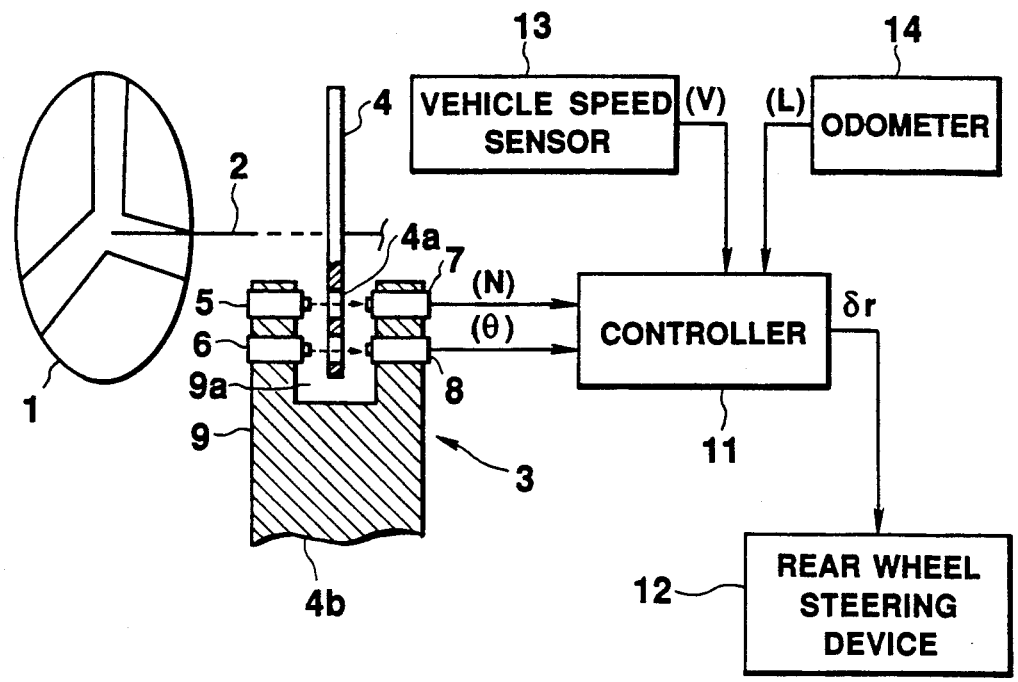
FIG. 2 is a schematic representation of a control mechanism according to the invention wherein details of a position sensing device are shown.
Figure 3:
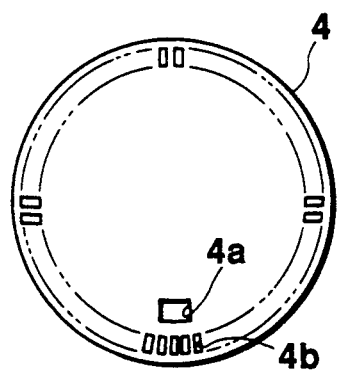
FIG. 3 is an elevation view of a shutter plate used in the sensing mechanism shown in FIG. 2.

In FIG. 2 an auxiliary steering mechanism according to an embodiment of the invention, which for the purposes of this disclosure will be considered to control the steering angle of the rear wheels of an automobile, is depicted schematically. The vehicular steering control mechanism comprises a steering wheel 1, which is mounted on a steering shaft 2 which is coupled to the front wheels (not shown) of the vehicle through a steering gear (not shown).

In order to detect the steering angle of the steering wheel, for the purposes of controlling the steering angle produced by the rear wheel steering device 12, a steering angle sensor assembly 3 is operatively connected with the steering shaft 2.

The steering angle sensor assembly 3 includes a rotor or shutter disc 4, which is coupled to the steering shaft 2, for synchronous rotation therewith. The rotor 4 is arranged to extend into a gap 9a which is defined in a sensor bracket 9. A pair of light sources 5 and 6, and a pair of light sensing elements 7 and 8 are arranged to face each other across the gap 9a.

The rotor 4 has, formed at a predetermined portion thereof, a neutral steering position indicator aperture 4a. Additionally, a plurality of turning angle indication slits 4b are formed around the periphery of the rotor 4.

The light source 5 is arranged such that, when the sensor rotor 4 is at the angle indicative of the neutral position of the steering wheel 1, the light emitted thereby is incident on the light sensing element 7. In response to this, the light sensing element 7 produces a neutral steering wheel angle indicator signal N.

On the other hand, the light source 6 is arranged radially further outward from the axis of the rotor 4 than the light source 5, so that the light, emitted therefrom, passes through the turning angle indication slits 4b and impinges on the light sensing element 8. This causes the light sensing element 8 to produce a pulse, of a pulsed steering angle indicator signal $\theta$, each time one of the turning angle indication slits 4b passes in front of it.

The neutral steering wheel angle indicator signal N and the pulsed steering angle indicator signal $\theta$ are supplied to the controller 11, so as to be processed thereby, for use in determining the steering angle of the rear wheel steering device 12.

The controller 11 is arranged to calculate and output a rear wheel steering angle signal $\delta r$. In addition to being coupled to the steering angle sensor assembly 3, the controller 11 is also operatively coupled to an odometer 14, which outputs a distance traveled signal L, and a vehicle speed sensor 13, which supplies a vehicle speed signal V. The pulsed steering angle indicator signal $\theta$, the neutral steering wheel angle indicator signal N, the vehicle speed signal V, and the distance traveled signal L, supplied to the controller 11 by the respective sensors, are processed in a manner which produces a control value for the rear wheel steering angle signal $\delta r$. The rear wheel steering angle indicator signal $\delta r$ is supplied to the rear wheel steering device 12, and serves to determine the auxiliary steering angle of the rear wheels.

The frequency, with which the control routine is run by the controller 11, is 5 msec. The control cycle is continuously repeated.

Figure 4:
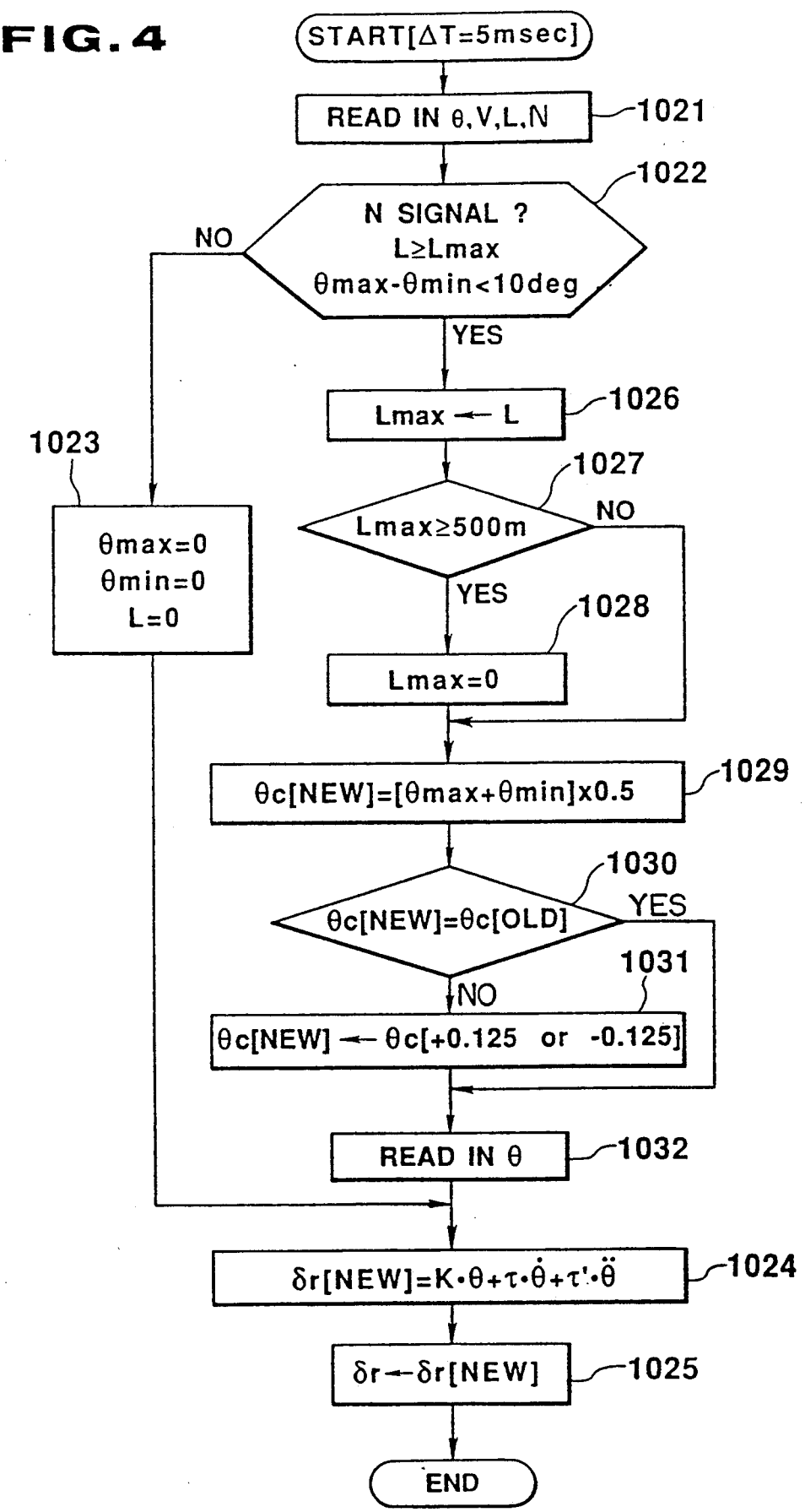
FIG. 4 is a flow chart showing the operations which characterize the control provided by the present invention.

As seen in FIG. 4, after starting the control cycle, at the first step 1021, the number of pulses, of the pulsed steering angle indicator signal $\theta$, counted from the most recent update of the neutral position of the neutral steering angle N, is read in. The neutral steering wheel angle indicator signal N is produced and updated each time the neutral steering position indicator aperture 4a, of the sensor rotor 4, becomes arranged between the light source 5 and the light sensing element 7, in response to the steering wheel 1 reaching its neutral position.

At the same time, the vehicle speed signal V from the vehicle speed sensor 13, the distance traveled signal L from the odometer 14, and the neutral steering wheel angle indicator signal N, are read in.

At step 1022 the neutral steering wheel angle indicator signal N, the distance traveled signal L, and the pulsed steering angle indicator signal $\theta$, are checked. A determination is made whether the neutral steering wheel angle indicator signal N exists. The distance traveled signal L is compared to a value Lmax to see if it is equal or greater than Lmax. The process for updating Lmax will be described hereinafter in greater detail. The pulsed steering angle indicator signal $\theta$ is checked to determine if the difference between predetermined upper and lower limit values $\theta$max and $\theta$min, is less than 10°. If the answer to all of the determinations made at step 1022 is "yes", the routine then goes to step 1026. If the answer to any one of the determinations made at step 1022 is "no", it is deemed that the working neutral position $\theta c$ cannot be renewed and the routine goes to step 1023.

At step 1023 the values, $\theta$max, $\theta$min, and L are all reset to zero. Thereafter the process goes directly to step 1024.

At step 1024 the control value for the rear wheel steering angle signal $\theta r$ is determined. First, the value of the steering angle, as indicated by the number of pulses of the pulsed steering angle indicator signal $\theta$ defined at step 1021, the angular velocity $\dot{\theta}$ of the steering wheel, the angular acceleration $\ddot{\theta}$ of the steering wheel and the fixed values $\tau$, $\tau'$ and K are processed according to the formula:

$$\delta r(New) = K \cdot \theta + \tau \cdot \dot{\theta} + \tau' \cdot \ddot{\theta} \qquad (1)$$

At step 1025 the old value $\delta r$ is updated with the newly derived value $\delta r(New)$ and the updated rear wheel steering angle signal $\delta r$ is supplied to the rear wheel steering device 12 to determine the turning angle thereof. Thereafter the routine goes to END.

On the other hand when, at step 1022, if the answers to all of the determinations are yes, it is determined that the renewal of the working neutral position $\theta c$ is possible, and the process goes to step 1026.

At step 1026 the value Lmax is updated according to the distance traveled signal L.

Following this at step 1027, a determination is made whether Lmax is greater than or equal to five hundred meters If the determination is affirmative "yes", the process goes to step 1028, whereat the value Lmax is set to zero. Thereafter, the process proceeds to step 1029.

If the determination at step 1027 is negative "No", the process skips step 1028, and goes directly to step 1029.

At step 1029 the neutral position $\theta c$(New) is updated according to the formula:

$$\theta c(New) = (\theta max + \theta min) \times 0.5 \qquad (2)$$

In accordance with the operation performed in step 1029 it is determined which one of the turning angle indication slits 4b, when it is aligned between the light source 6 and the light sensing element 8, is to define, temporarily, the working neutral position $\theta c$. Thereafter, the process goes to step 1030.

At step 1029 a determination is made whether $\theta c$(New) is equal to $\theta c$(Old). If the answer at step 1030 is "yes", the process skips step 1031 and proceeds directly to step 1032.

If the answer at step 1030 is "No", the process goes to step 1031, whereat the value of $\theta c$(Old) is altered, in the direction of the value $\theta c$(New), by a 0.125 degree increment.

Figure 5:
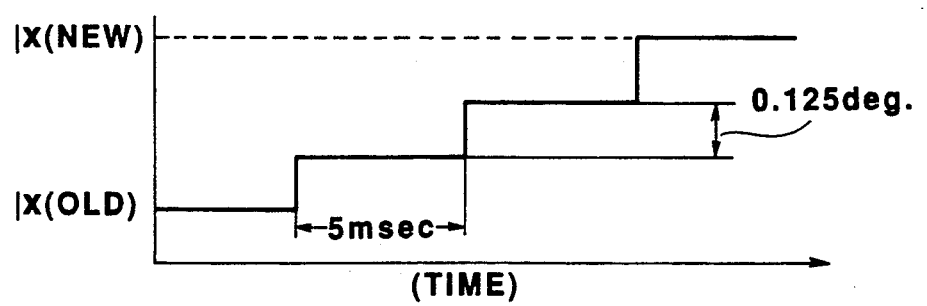
FIG. 5 is a timing chart depicting the stages in which a control signal is varied during the correction process in which a difference between a working neutral position and the actual neutral position, is eliminated.

By setting the renewal increment value, in step 1031, at the small value of 0.125, adjustments in the working neutral position $\theta c$ are made in relatively minute increments as depicted in FIG. 5, and are drawn out over a large number of the 5 msec control cycles, so that sudden changes in the steering angle of the rear wheels are avoided.

Thereafter, at step 1032, the newly adjusted working neutral position $\theta c$ is re-read and the number of pulses of the pulsed steering angle indicator signal $\theta$, as counted from the newly established working neutral position $\theta c$, set in the above steps, is determined.

Thereafter, using the newly obtained values determined in the above steps, the steering angle $\delta r$ is determined for the rear wheel steering device 12.

Thus, the rear wheel steering angle signal $\delta r$, determined according to the process of the invention, is adjusted according to a working neutral position $\theta c$ so as to eliminate any errors which may have occurred due to erroneous sensing of the steering angle of the steering wheel 1.

With the above technique, when adjustments of the neutral position are required, the adjustment of the steering angle is always made gradually and in a manner which alleviates the driver of the need to consciously effect any changes in steering.

Accordingly, the sudden and alarming adjustments of the steering angle which tend to occur in the prior art, are eliminated, and the steering response characteristics of the vehicle are improved.

Although, in the above described embodiment, the sensing means for detecting the steering angle and the neutral angle of the steering wheel, is disclosed as being comprised of a light source/shutter disc type arrangement, it will be readily understood by those skilled in the art that embodiments wherein other types of sensing means are employed, are readily conceivable and within the purview of the present invention.

It will also be understood that, although in the above embodiment the controller 11 incorporates the readings from a vehicle speed sensor 13 and an odometer 14, embodiments of the invention wherein these parameters are not taken into account, as well as embodiments wherein other parameters, not mentioned above, are included in the operations of the controller 11, are also within the purview of the present invention.

It will be additionally noted that in the event that the steering wheel can be rotated more than 360° from the neutral position before reaching the lock, it will be necessary to discriminate between a home indicative signal which is produce at the home position and a signal which is generated every 360° therefrom.

This can be done either mechanically or electronically. For example, if the angular position of the steering wheel is indicated as being more than 20° (merely by way of example) from the home or neutral position by the output of the light sensor 8, then the output of the home position sensing arrangement can be ignored. The manner in which such a sub. routine could be arranged in the routine depicted in the flow chart shown in FIG. 4 is deemed readily within the capability of one skilled in the instant art.

Alternatively, or in combination with the above soft control technique, a second shutter disc of suitable diameter and which is connected to the same shaft as disc 4 by way of planetary gear type pinion gears, can be arranged to rotate at different rate away from the home position and therefore block the light which is transmitted from the light source 5 to the light sensor 7 except when both discs assume their true home positions.

What is claimed is:

1. An auxiliary steering control system for an automotive vehicle comprising:
   sensing means for sensing rotational motion of a steering wheel of a vehicle and producing a neutral position signal indicating a neutral position of the steering wheel and an angular position signal indicating an angular displacement of the steering wheel from said neutral position;
   a controller comprising means for determining a working neutral position value, mean for determining a steering wheel angle from the angular position signal with respect to the working neutral position value, means for determining an actual neutral position value in response to the neutral position signal, means for changing the working neutral position value in a stepwise manner toward the actual neutral position value by fixed increments at regular time intervals, means for determining an auxiliary steer angle in accordance with the steering wheel angle, and means for producing a control signal indicating the auxiliary steer angle; and
   an auxiliary steering device for steering a wheel of the vehicle in response to the control signal.

2. An auxiliary steering control system according to claim 1 wherein:
   the means for changing the working neutral position value changes the working neutral position value such that a deviation between the working neutral position value and the actual neutral position value is reduced toward zero in a plurality of fixed increments;
   the means for determining a steering wheel angle determines the steering wheel angle with reference to the working neutral value even when the deviation is not equal to zero; and
   the means for determining an auxiliary steer angle determines the auxiliary steering angle based on the steering wheel angle even when the deviation is not equal to zero.

3. An auxiliary steering control system according to claim 2 wherein each of the increments is smaller than the deviation at the time the neutral position signal is produced.

4. An auxiliary steering control system according to claim 1 wherein:
   the means for determining a steering wheel angle determines the steering wheel angle with respect to the working neutral position value each time the working neutral position value is changed by the means for changing the working neutral position value; and
   the mean for determining an auxiliary steering angle determines the auxiliary steer angle in accordance with the steering wheel angle each time the working neutral position value is changed by the means for changing the working neutral position value.

5. An auxiliary steering control system according to claim 4 wherein the control signal is proportional to a linear function of the steering wheel angle, a steering velocity equal to the time rate of change of the steering wheel angle, and a steering acceleration equal to the time rate of change of the steering velocity.

6. An auxiliary steering control system according to claim 1 wherein said sensing means comprises a first light sensor, a first light source, and a shutter element, said shutter element having a plurality of movable slits for selectively illuminating said light sensor with said light source.

7. An auxiliary steering control system according to claim 6 wherein said shutter element has a home position aperture, said sensing means including a second light source and a second light sensor, said home position aperture being located for illuminating said second light sensor with light from said second light source when said steering wheel assumes its neutral position.

8. A steering sensor for an automotive vehicle comprising:
   sensing means for sensing rotational motion of a steering wheel and producing a neutral position signal indicating a neutral position of the steering wheel;
   means for determining a working neutral position value of the steering wheel;
   means for determining an actual neutral position value in response to the neutral position signal; and
   means for changing the working neutral position value in a stepwise manner toward the actual neutral position value by a plurality of fixed increments at regular time intervals when the neutral position signal is produced.

* * * * *